March 2, 1971  G. PASCOE ETAL  3,566,479

ELECTROMECHANICAL SURFACE SCANNER

Filed May 15, 1967  15 Sheets-Sheet 1

INVENTORS:
GEORGE PASCOE
BY EARLE H. STEVENSON

ATTORNEYS.

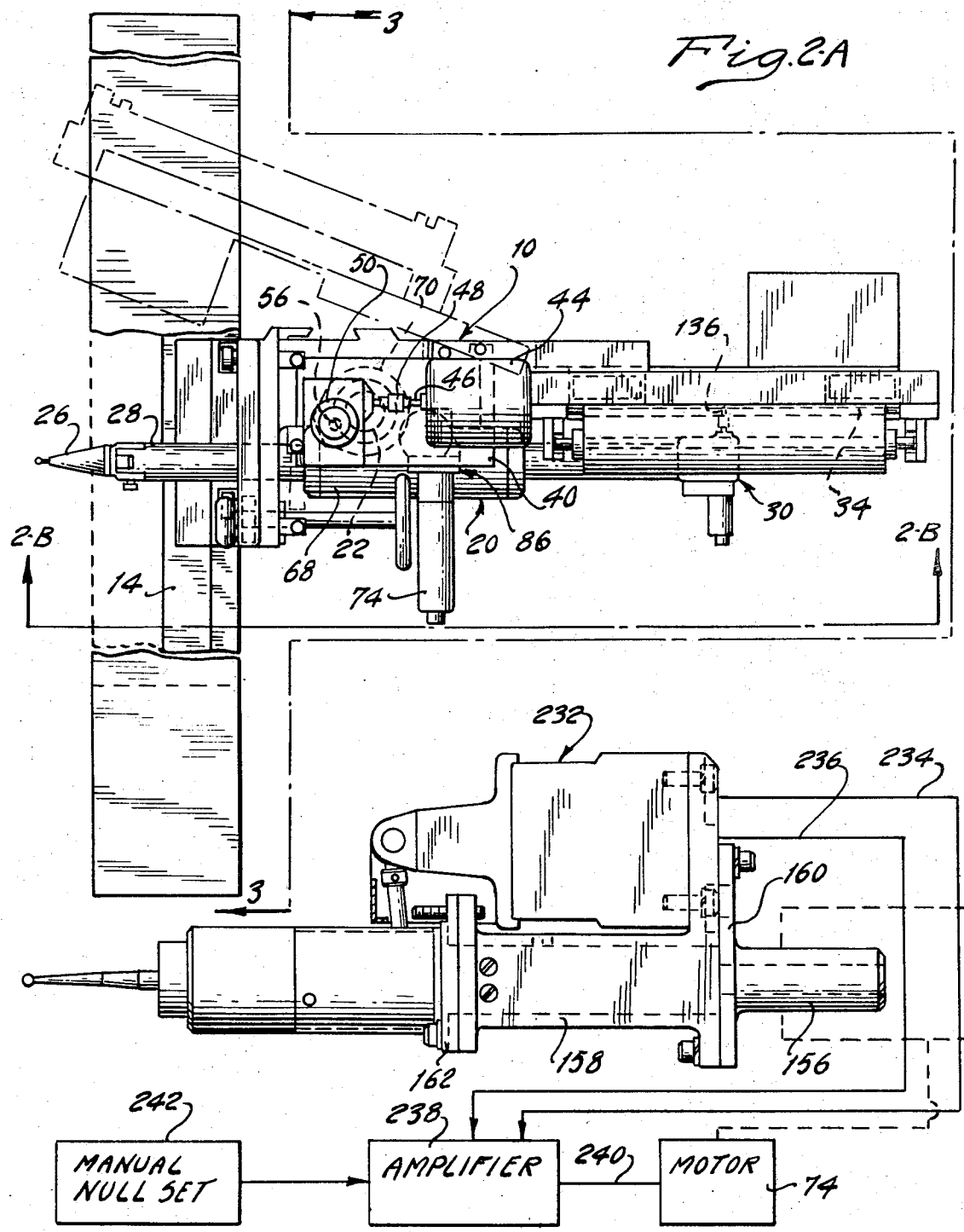

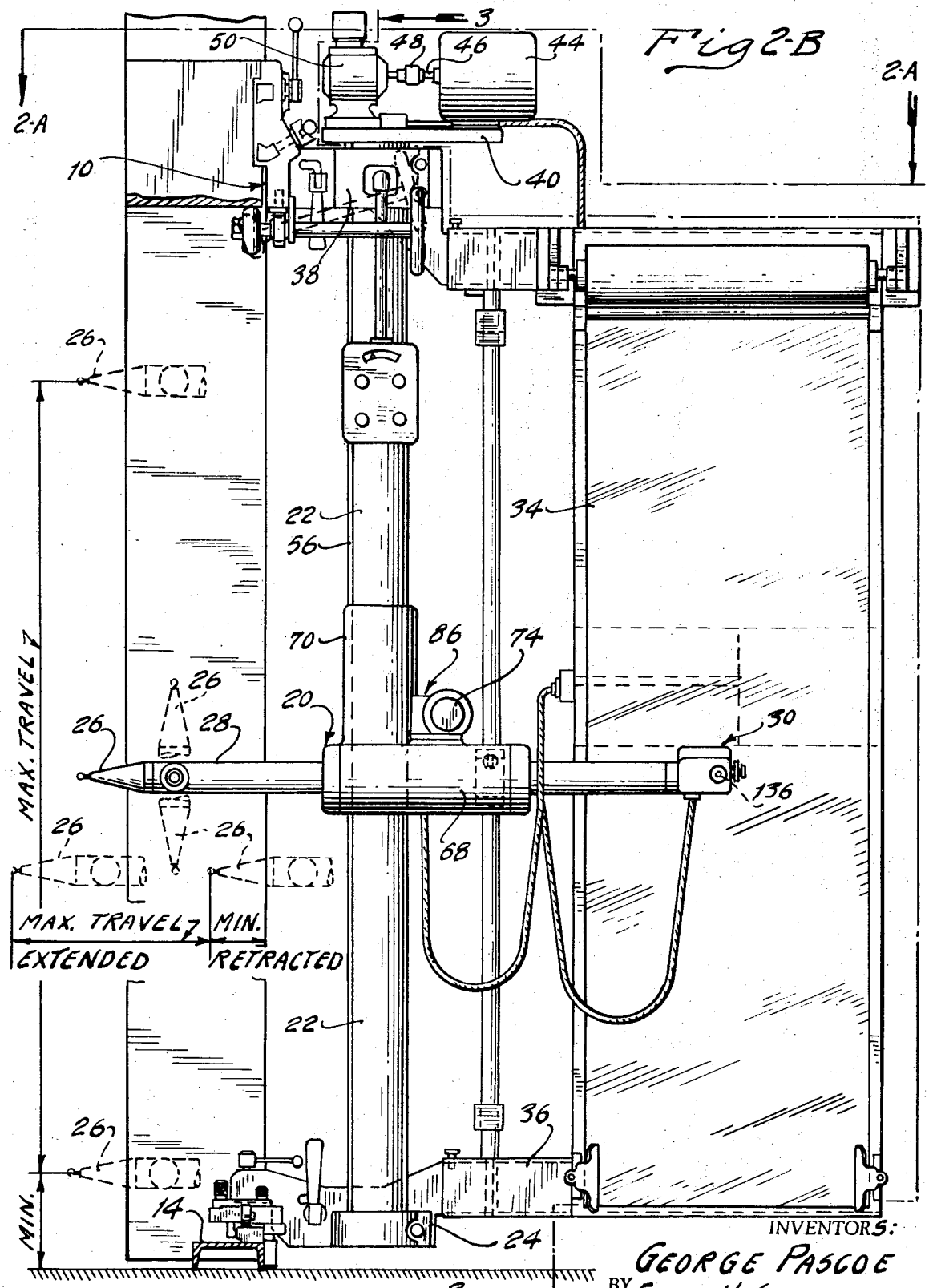

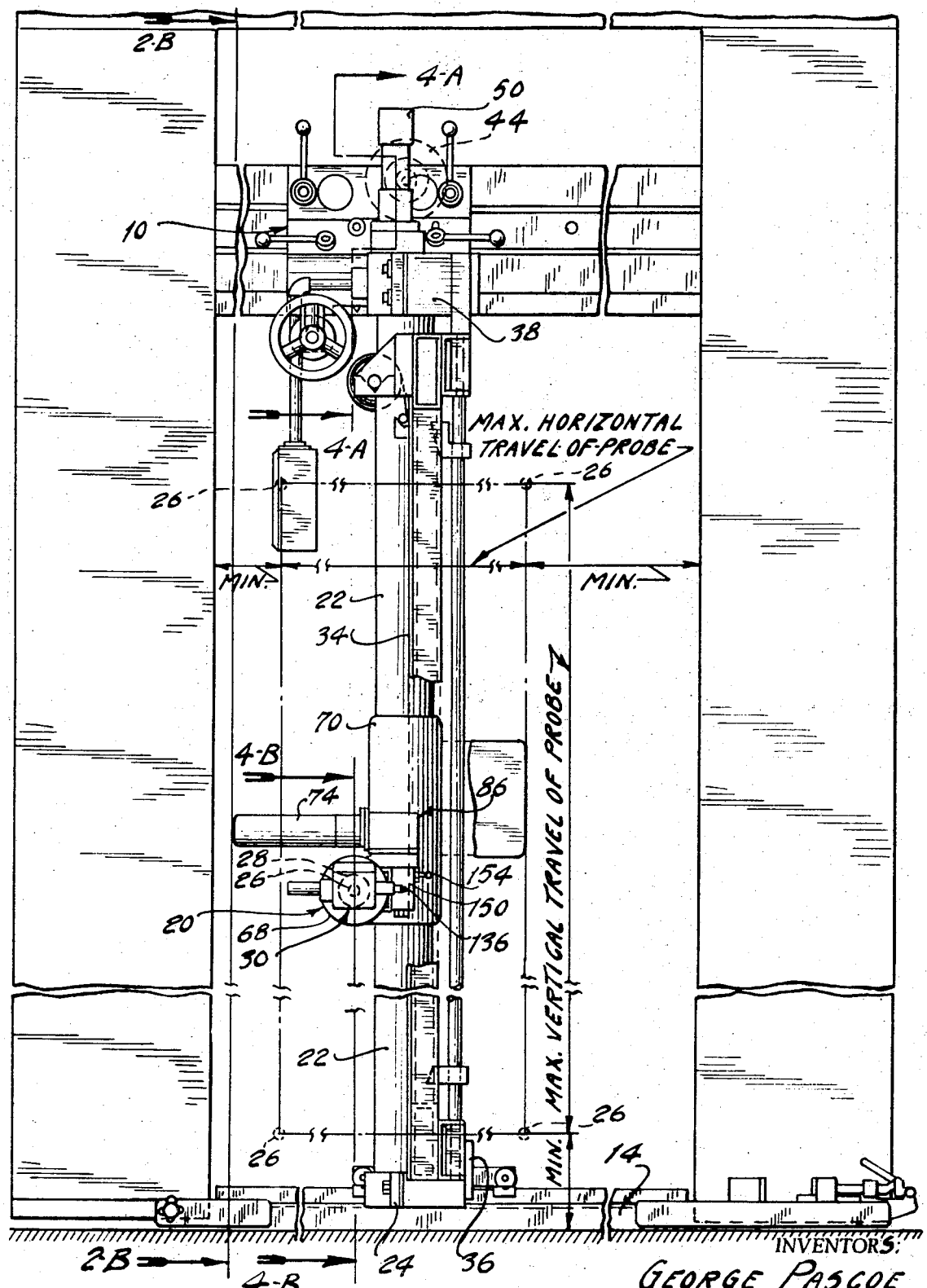

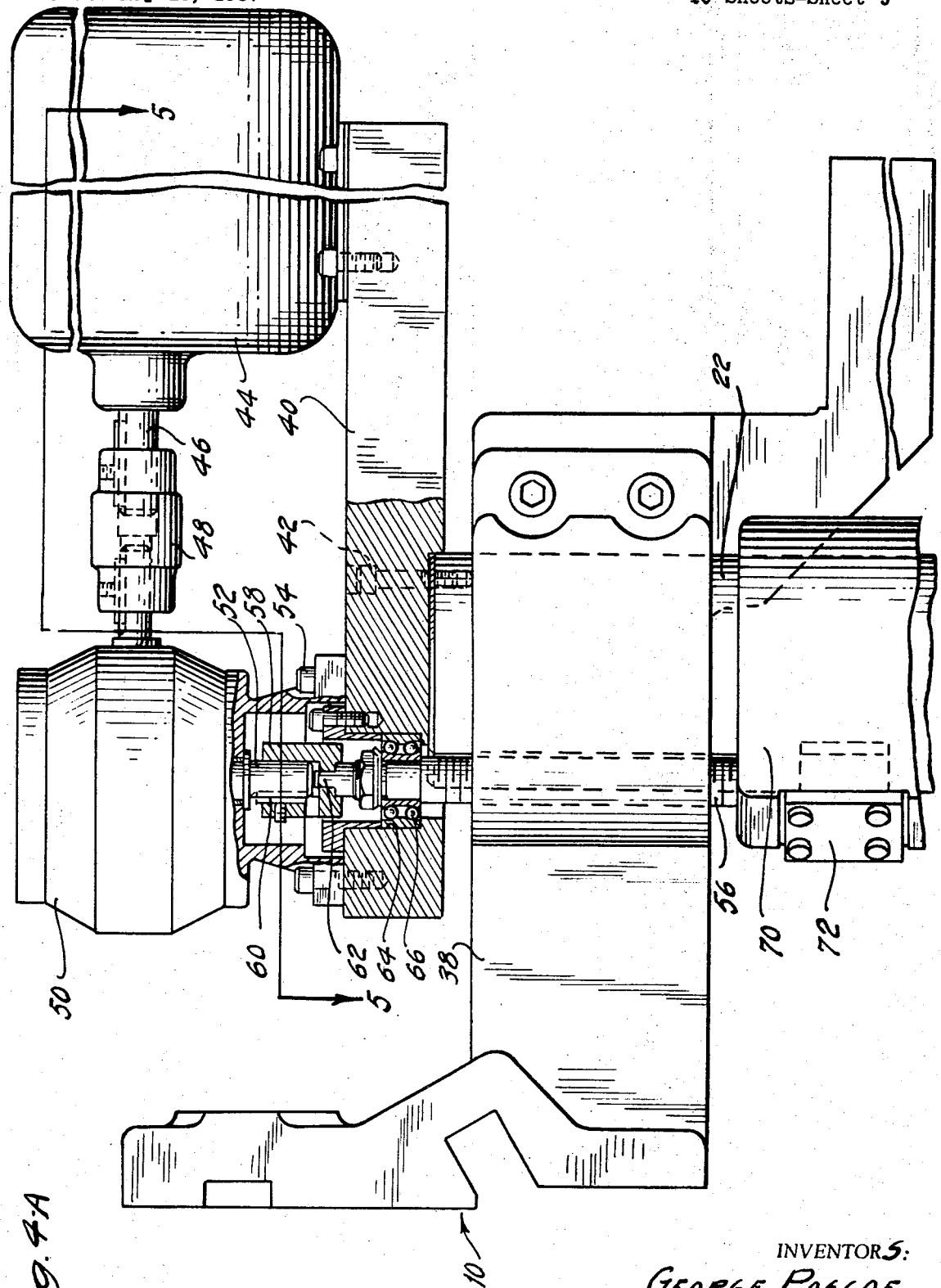

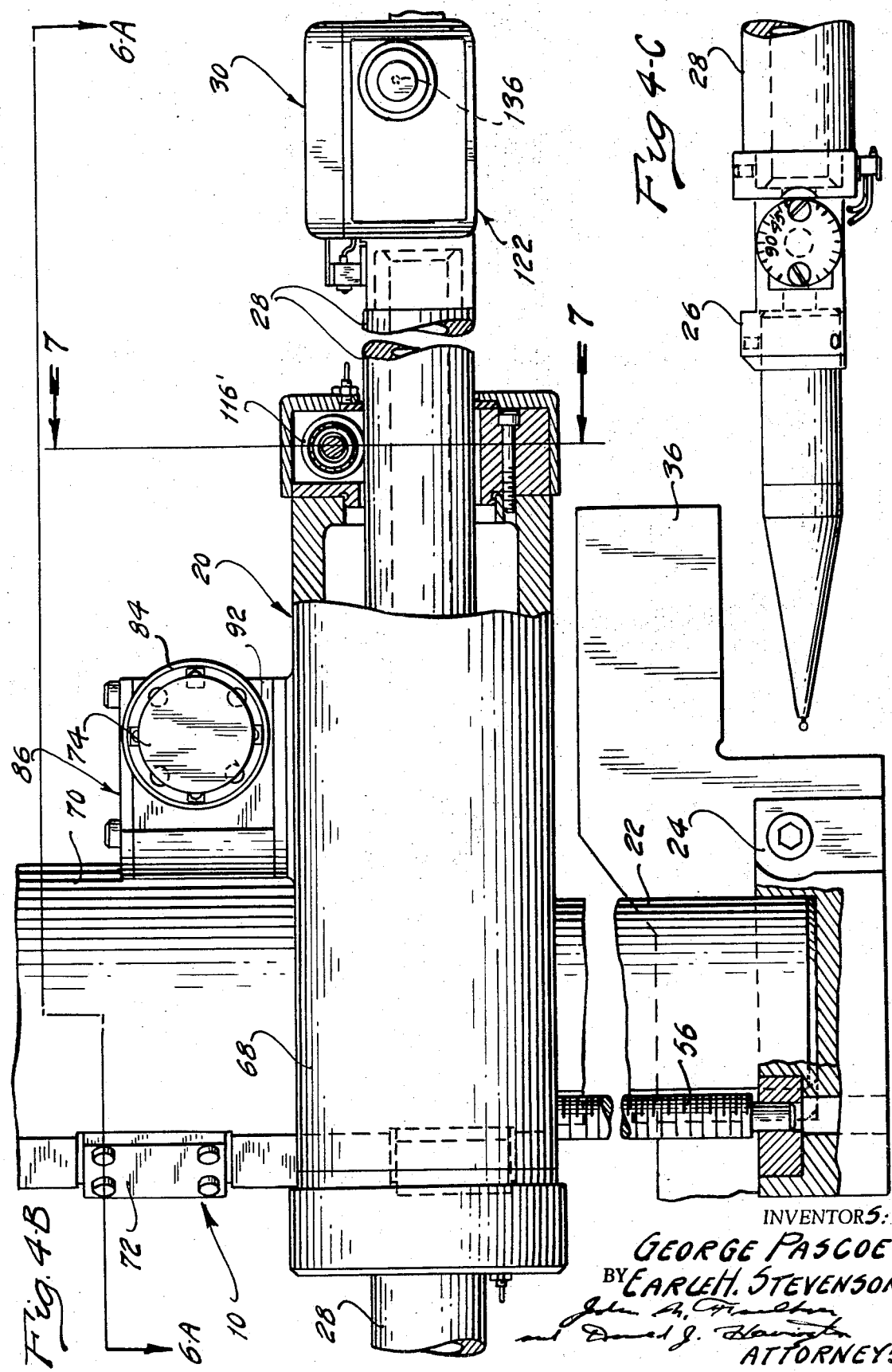

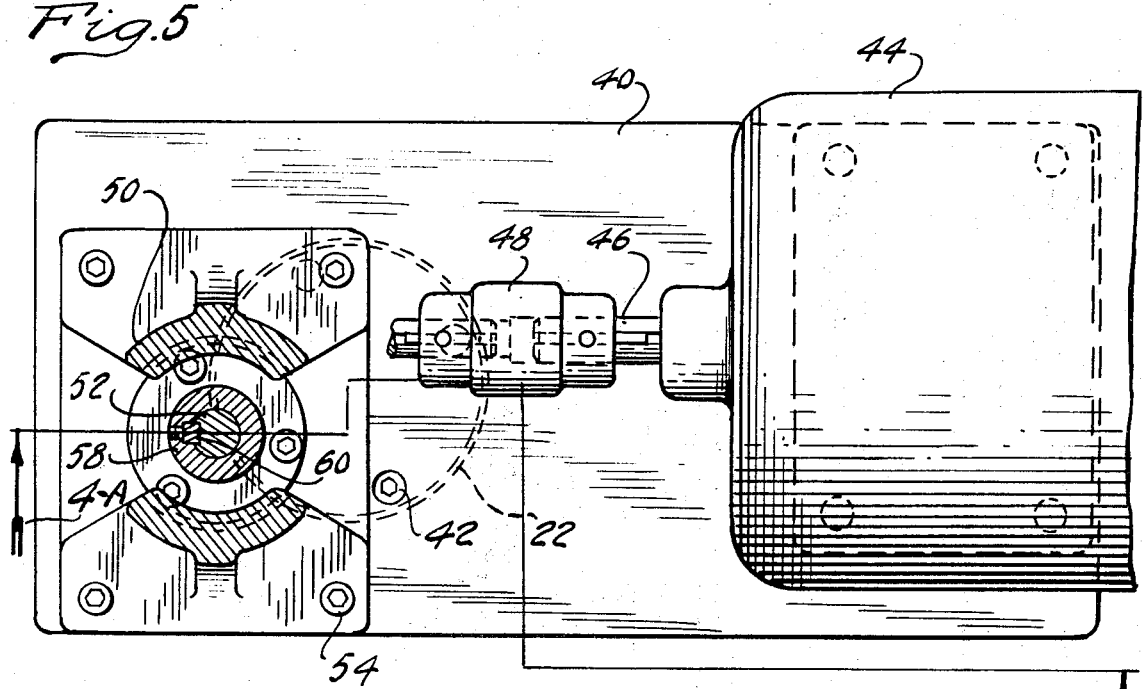
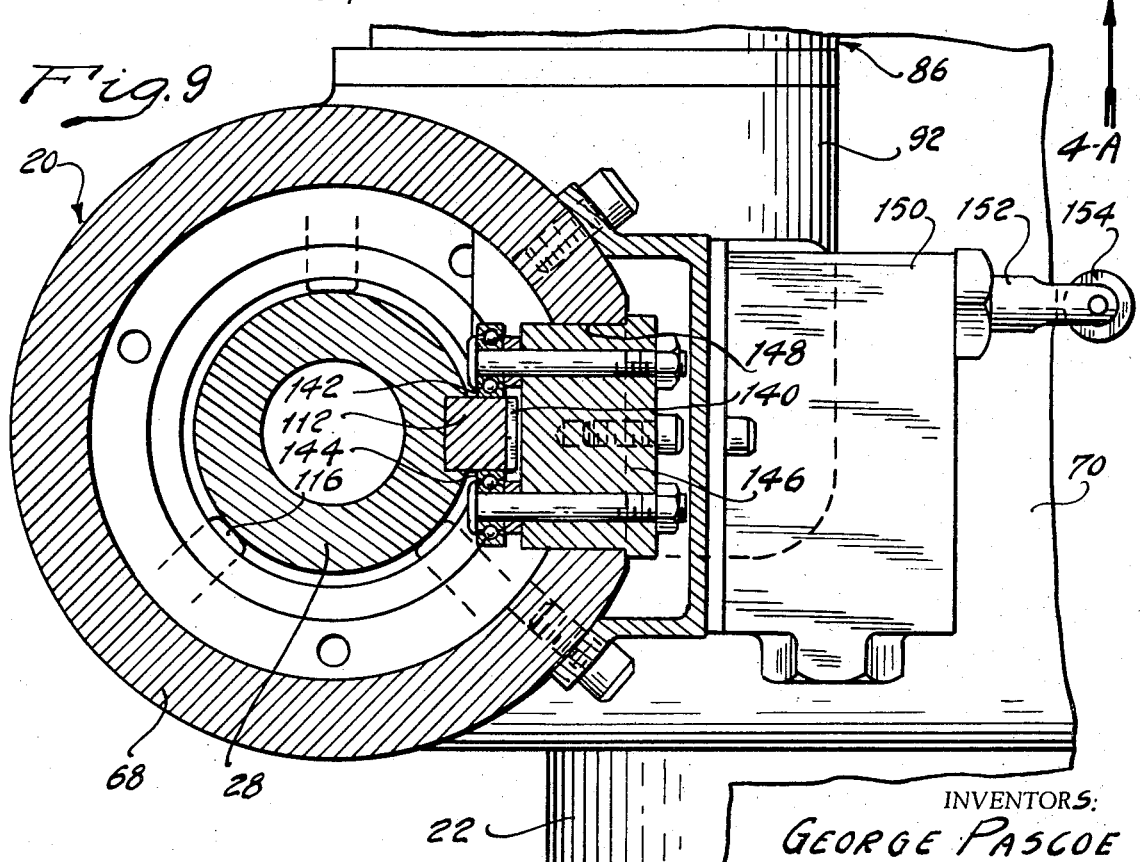

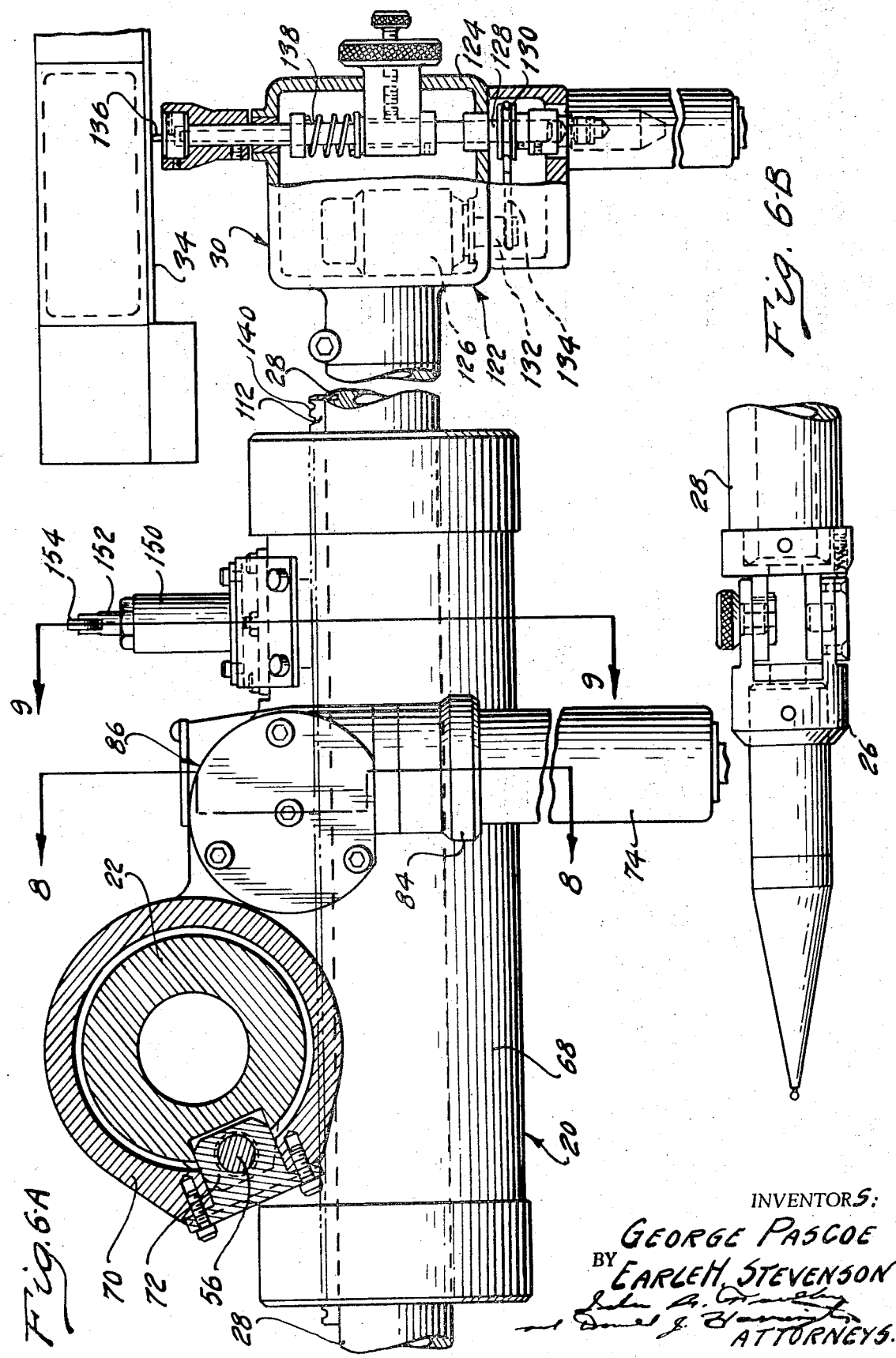

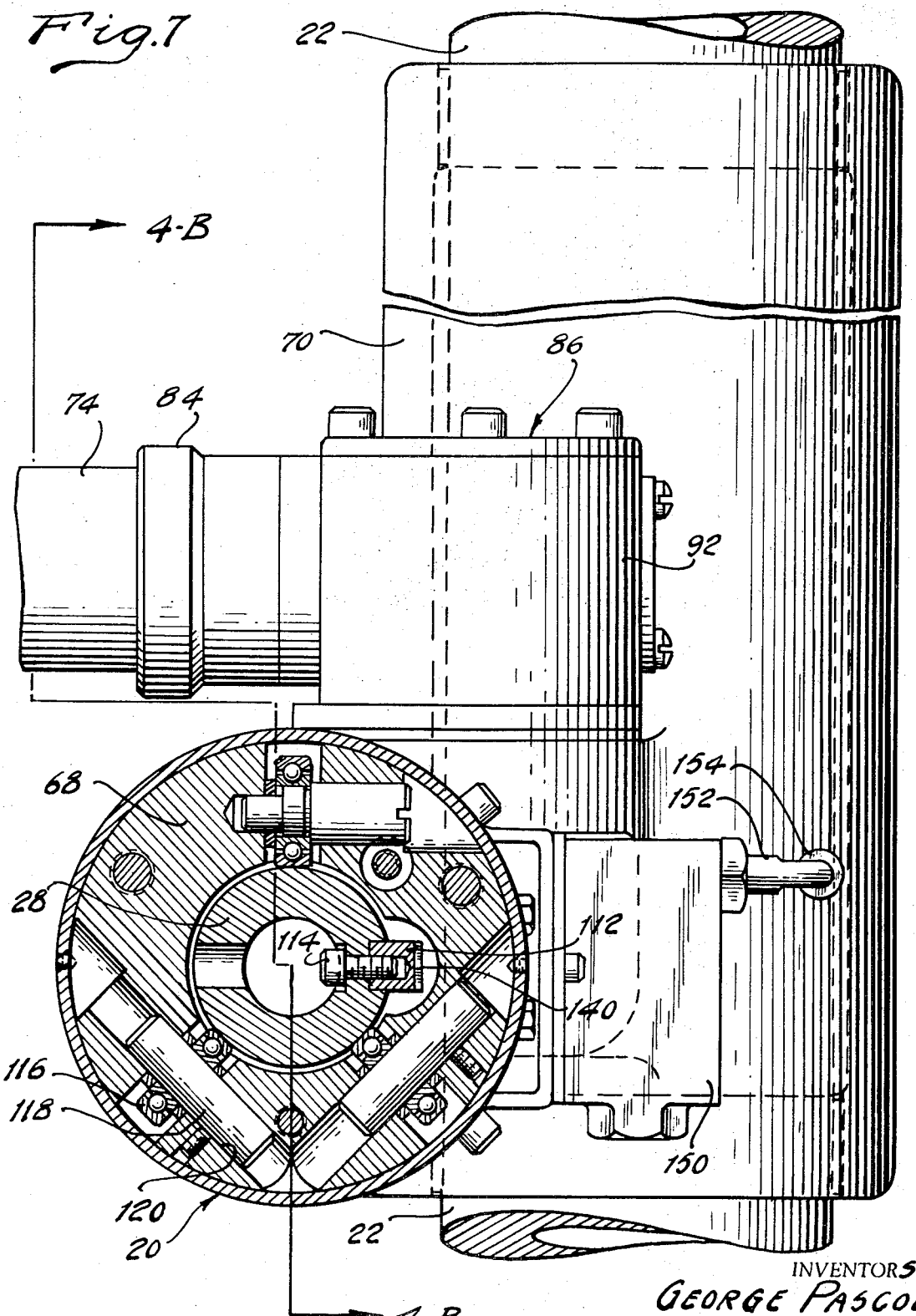

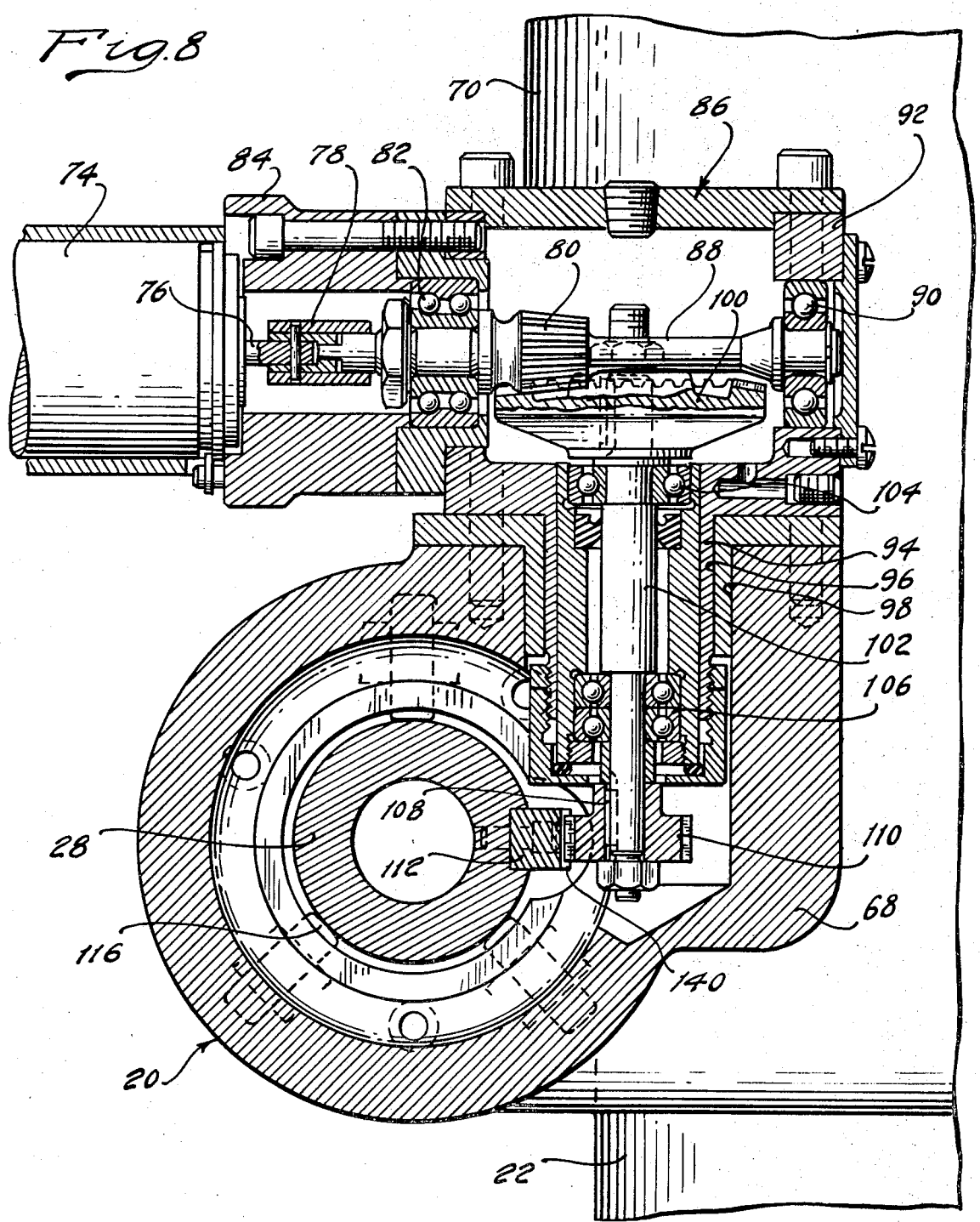

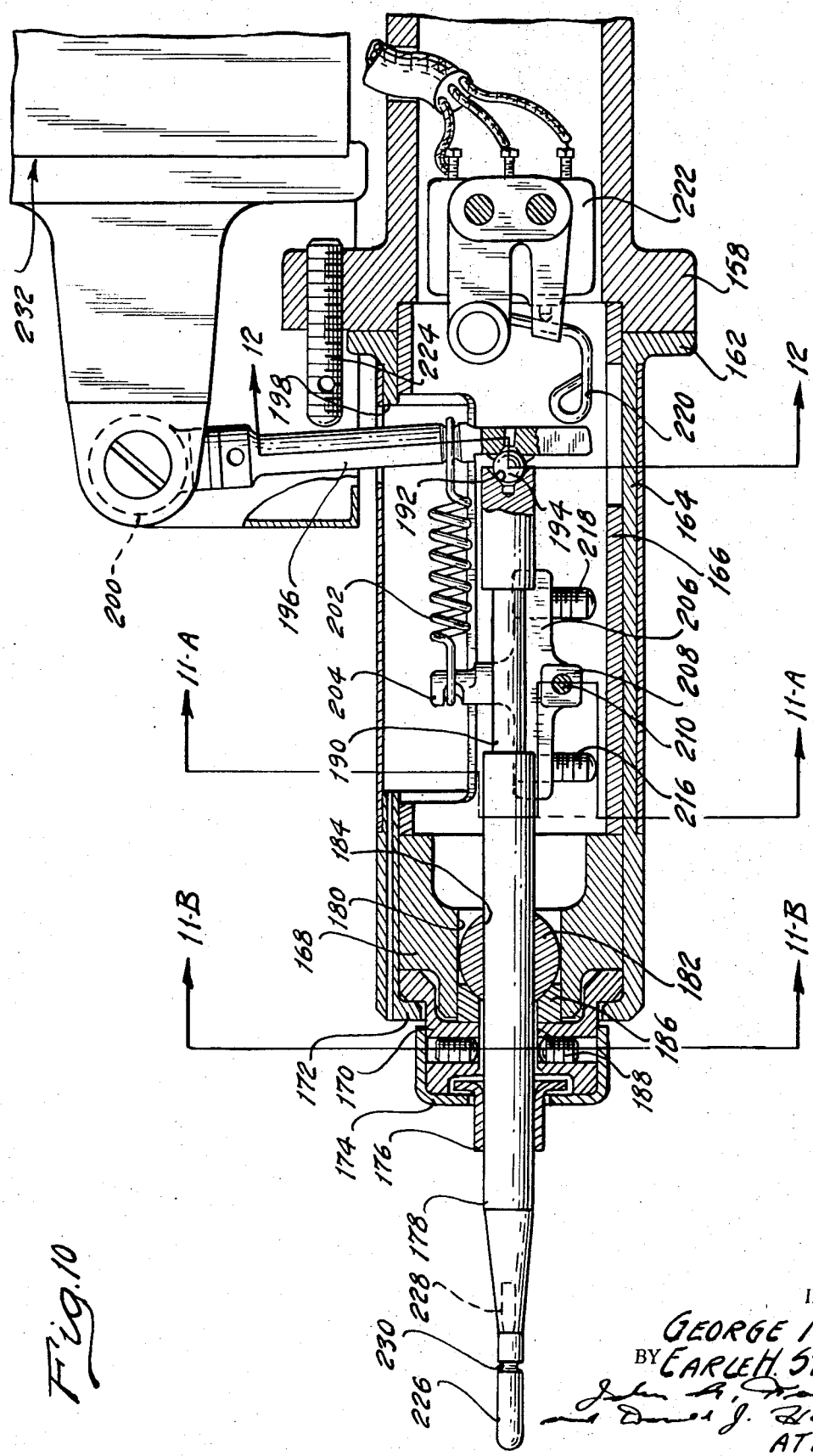

March 2, 1971 G. PASCOE ETAL 3,566,479
ELECTROMECHANICAL SURFACE SCANNER
Filed May 15, 1967 15 Sheets-Sheet 12
Fig.11·B
Fig.11·A
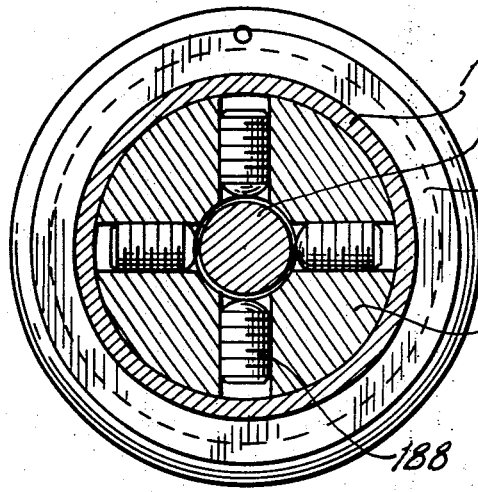
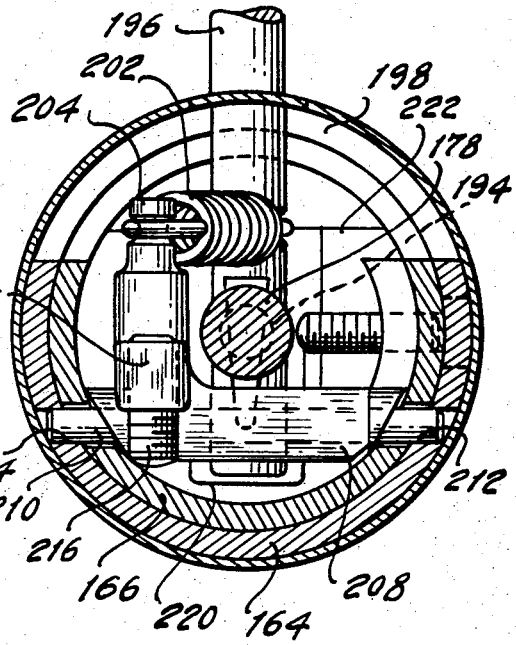
Fig.12
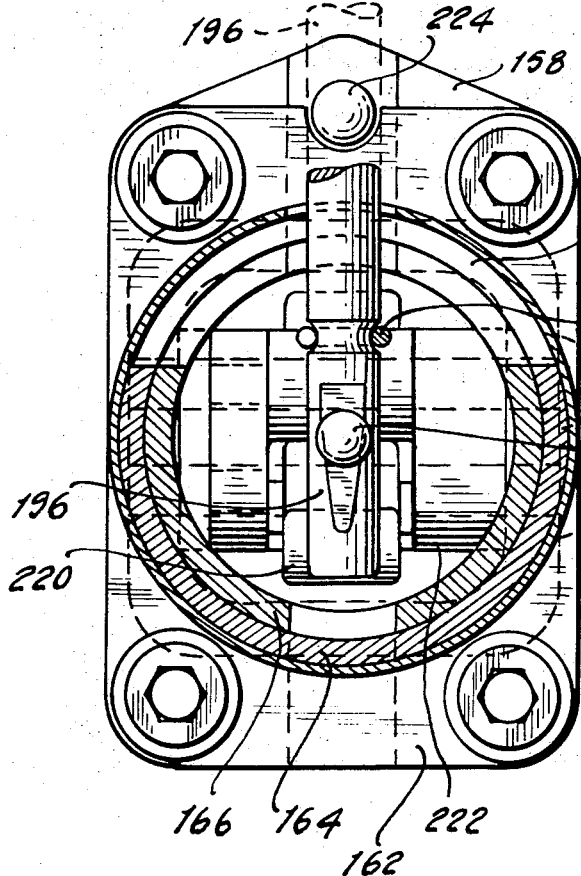
INVENTORS:
GEORGE PASCOE
BY EARLE H. STEVENSON
ATTORNEYS.

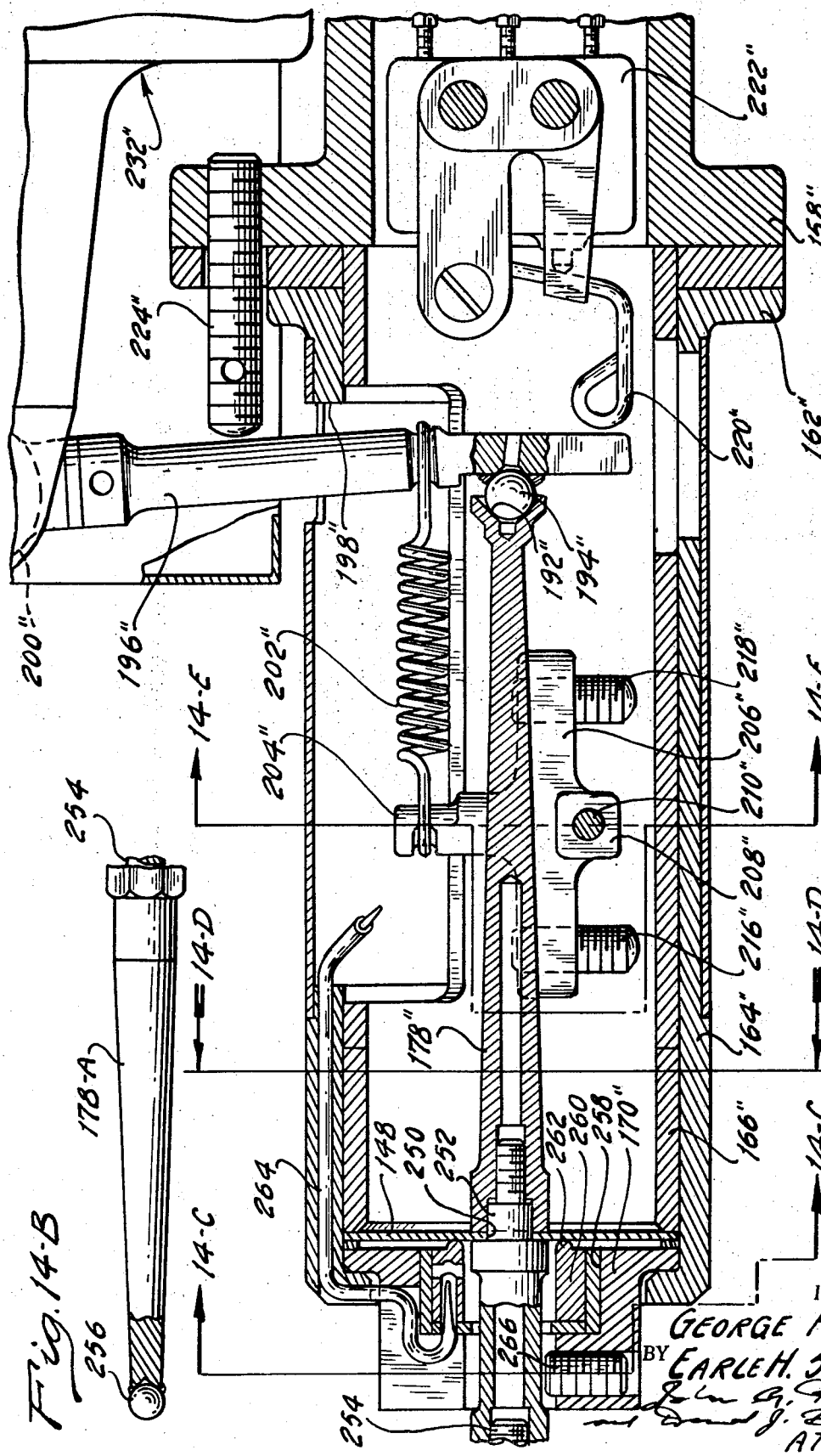

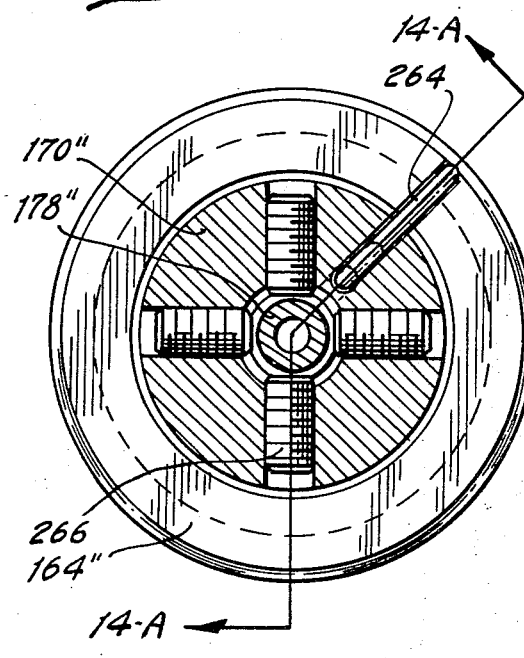
Fig.14-C
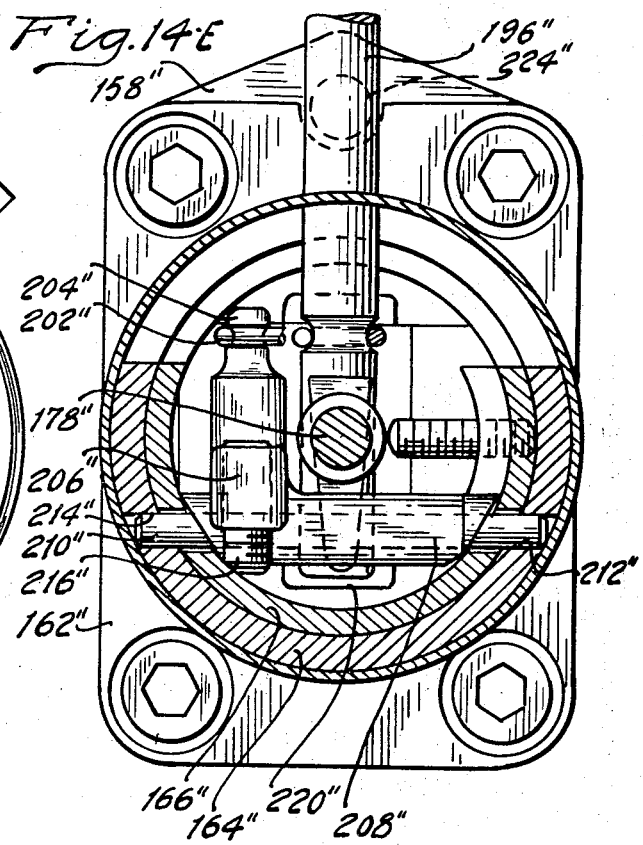
Fig.14-E
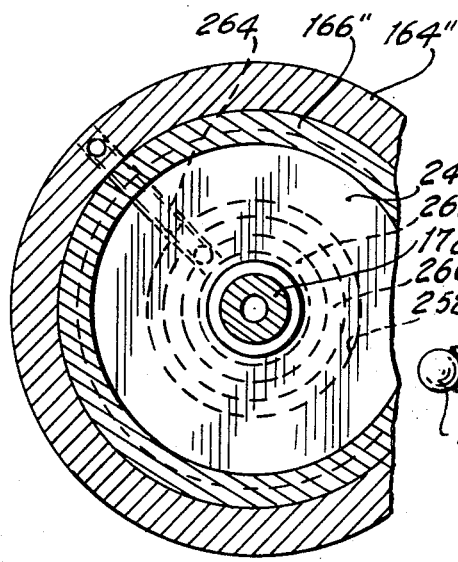
Fig.14-D
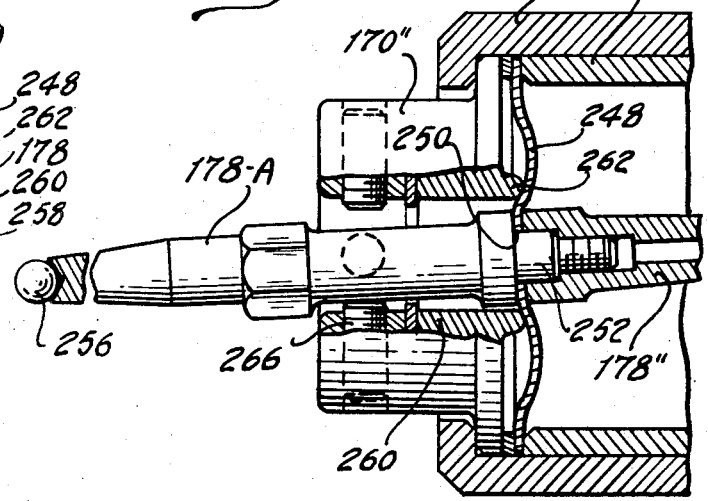
Fig.14-F

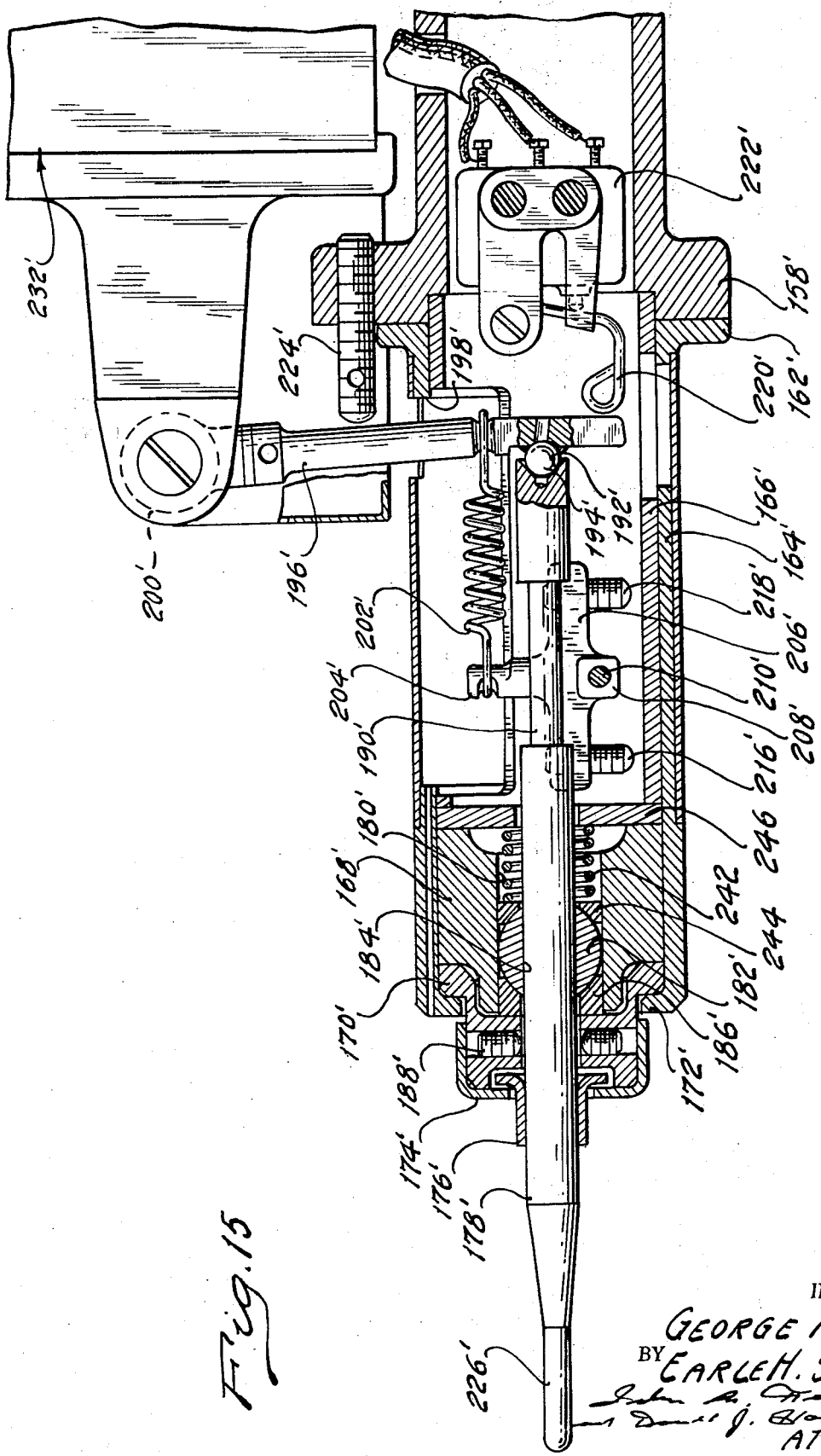

United States Patent Office 3,566,479
Patented Mar. 2, 1971

3,566,479
ELECTROMECHANICAL SURFACE SCANNER
George Pascoe, Dearborn, and Earle H. Stevenson, Detroit, Mich., assignors to Ford Motor Company, Dearborn, Mich.
Filed May 15, 1967, Ser. No. 638,382
Int. Cl. G01b 13/08
U.S. Cl. 33—174                    1 Claim

ABSTRACT OF THE DISCLOSURE

This specification describes a scanner for measuring the coordinates of points on a three-dimensional surface. It includes a surface contacting probe and a closed-loop probe position control for adjusting the probe and for maintaining a predetermined pressure on the probe while recording the coordinate data. Universal movement of the probe permits a proper control response regardless of the direction of the normal to the surface at the point being measured.

GENERAL DESCRIPTION OF THE INVENTION

Our invention relates generally to the design and manufacture of three-dimensional objects having non-analytical surface contours. It relates more particularly to improvements in mechanisms for scanning three-dimensional clay model surfaces, for recording coordinate data for surface points on the clay model and for reproducing surface contours on the clay model in two dimensions.

The improvements of our invention have particular application in the development of preliminary automotive vehicle body surfaces for use in automotive vehicle styling and body engineering methods.

In the styling and design of vehicle bodies, one of the first operational steps is the development of a clay model. The designer and stylist can manipulate the clay model surfaces at this stage to produce the desired aesthetic and functional values in the three-dimensional configuration. Dimensional accuracy and symmetry can be achieved by preparing two-dimensional templates having edge contours that correspond to the contour of the three-dimensional clay surface when measured along a predetermined section line. The section line is obtained by passing a plane transverse to the plane of the measured surface. A two dimensional layout of the three-dimensional clay model surface is prepared on a body draft plate so that compensation can be made for surface irregularities in the clay model surface and so that surface contours that become apparent on the two-dimensional layout can be transferred back to the three-dimensional clay model. Readings of the coordinates for the clay model surface points at the affected sections then are repeated and appropriate changes are made on the two-dimensional layout. This procedure continues until a desired surface shape is obtained.

The coordinates of selected points taken along the section lines, the boundary lines and the edge lines in any given surface, as well as coordinates of selected points on other characteristic contour lines, are then recorded by a data plotter system including a coordinatograph instrument and transferred to data processing cards or tape. The data then is used in a computer-assisted method for developing analytically body surface points and for recording the characteristics of the numerically designed surface on control tape which in turn can be used in numerically controlled machine tool systems in forming three-dimensional reproductions of the original clay model surface. The reproduction, for example, can be a wood model of the clay model surface or it can be a three-dimensional body die as described in co-pending application Ser. No. 577,997. Reference may be made to that co-pending application for purposes of our instant disclosure.

The output data of our improved clay model scanner may be used both in the formation of two-dimensional templates used in the vehicle styling and body engineering activities and in the formation of two-dimensional drafts on body draft plates as part of a data processing routine for preparing three-dimensional dies.

Our improved mechanism comprises a probe head that may be mounted on a conventional styling bridge so that it may contact the surface of a clay model located on the bridge. Provision is made for adjusting the probe head in a direction transverse to the plane of symmetry of the model and in a direction parallel to the vertical plane of symmetry of the model. Adjustments of the probe head in a horizontal direction parallel to the plane of symmetry of the model is accomplished by adjusting the position of the bridge which carries the probe head. The probe head is located, therefore, at preselected section lines which are determined by the adjusted position of the styling bridge in a horizontal direction parallel to the plane of symmetry of the model. This direction will be referred to hereafter as the "X axis direction."

The vertical direction of the probe head adjustments will be referred to in this description as the "Z axis direction" and the direction of motion of the probe head as it is advanced toward and away from the vertical plane of symmetry of the model will be referred to in this description as the "Y axis direction."

The provision of a three-dimensional surface scanner of the type described in the preceding discussion is an object of our invention. It is another object of our invention to provide a scanner as set forth above wherein provision is made for driving the scanner head automatically in both the Y axis direction and the Z axis direction, and wherein the automatic adjusting means for effecting adjustment in one axis, preferably the Y axis, is sensitive to the probe pressure of the gauge head as it contacts the three-dimensional model surface thereby permitting the gauge head to follow the outline of the surface as it traverses the surface in a characteristic section plane transverse to the model surface.

It is a further object of our invention to provide a model scanner of the type above set forth wherein the Y axis adjusting mechanism for the gauge head is controlled by an automatic servo motor having a closed servo loop circuit that responds to an increase or decrease in probing pressure with respect to a predetermined design value either to retract or advance the probe as automatic adjustments are made in the Z axis direction.

It is a further object of our invention to provide a scanner of the type above set forth wherein provision is made for reproducing in two-dimensional form the coordinate data for the surface points on the model that are contacted by the gauge head.

BRIEF DESCRIPTION OF THE FIGURES
OF THE DRAWINGS

FIGS. 2A and 2B show, respectively, a plan view and and elevation view of a scanner assembly capable of embodying the improvements of our invention. FIG. 2A is taken from the plane of section line 2A—2A of FIG. 2B and FIG. 2B is taken from the plane of section line 2B—2B of FIG. 2A and FIG. 3.

FIG. 3 is a front elevation view of the structure shown in FIGS. 2A and 2B as seen from the plane of section line 3—3 of FIGS. 2A and 2B.

FIGS. 4A and 4B are enlarged views of the scanner assembly illustrated in FIG. 3 with part shown in elevation and part shown in section. They are taken from the plane of sections lines 4A—4A and 4B—4B, respectively in FIG. 3.

FIG. 4C is a detail view of the probe head.

FIG. 5 is a transverse cross-sectional view taken along the plane of section line 5—5 of FIG. 4A.

FIG. 6A is a cross-sectional view taken along the plane of section line 6A—6A of FIG. 4B.

FIG. 6B is another detail view of the probe head.

FIG. 7 is a cross-sectional view taken along the plane of section line 7—7 of FIG. 4B.

FIG. 8 is a cross-sectional view taken along the plane of section line 8—8 of FIG. 6A.

FIG. 9 is a cross-sectional view taken along the plane of section line 9—9 of FIG. 6A.

FIG. 10 is a longitudinal cross-sectional view of an electromechanical gauge head which embodies the improvements of our invention and which may be mounted on the assembly of FIGS. 1 through 9.

FIGS. 11A and 11B are cross-sectional views taken along the planes of section lines 11A—11A and 11B—11B, respectively, of FIG. 10.

FIG. 12 is a cross-sectional view taken along the plane of section line 12—12 of FIG. 10.

FIG. 13 is a schematic view showing the principal elements of the closed servo loop system of which the structure shown in FIG. 10 is a part.

FIG. 14A is a longitudinal cross-sectional view showing an alternate gauge head construction corresponding to the structure of FIG. 10.

FIG. 14B is a detail view of the probe head tip for the FIG. 14A construction.

FIGS. 14C, 14D and 14E are section views taken along section lines 14C—14C, 14D—14D and 14E—14E, respectively, in FIG. 14A.

FIG. 14F shows a part of the structure of FIG. 14A in another operating mode.

FIG. 15 shows a modified gauge head design similar to the design of FIG. 10.

PARTICULAR DESCRIPTION OF THE INVENTION

Figure 1:
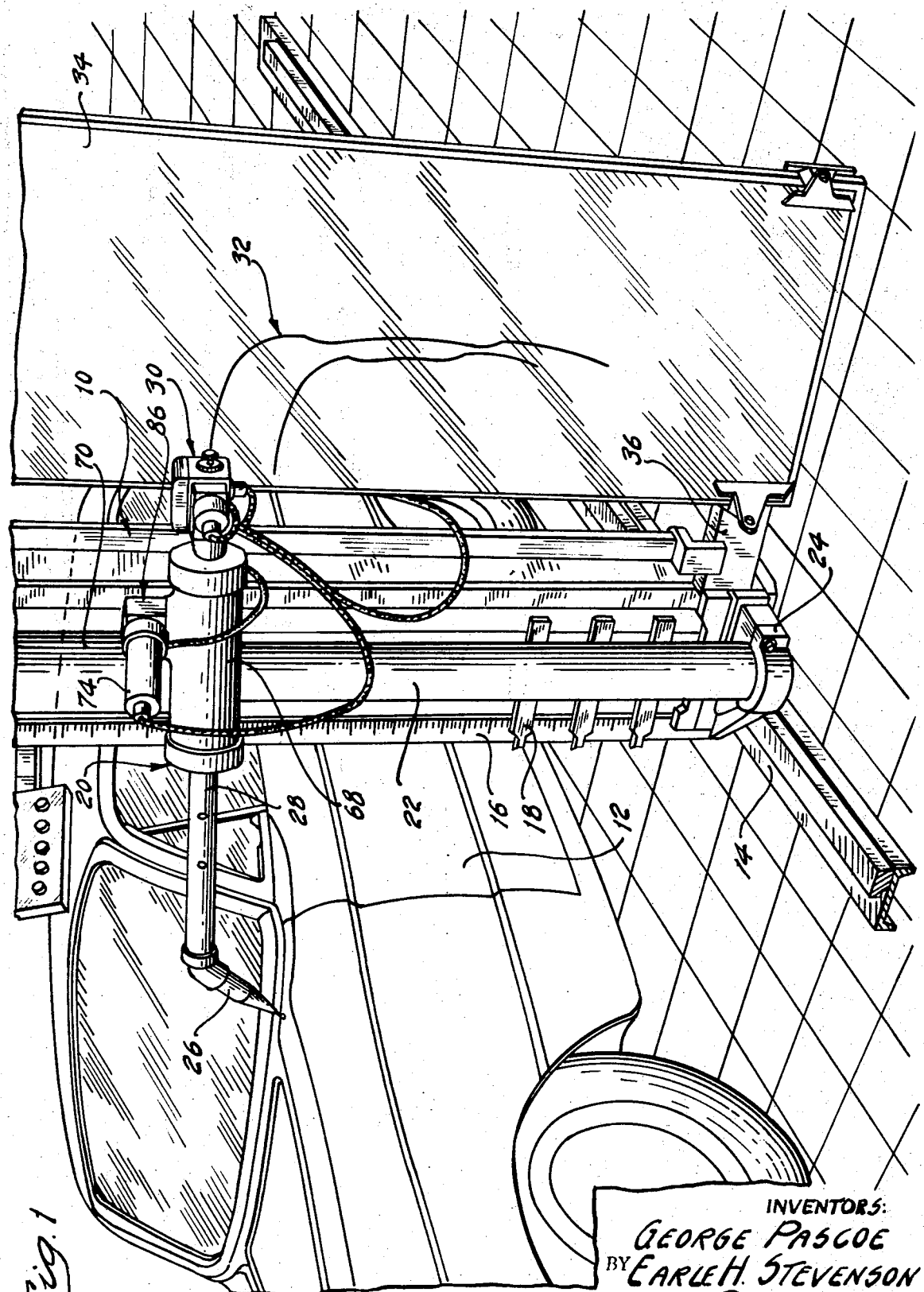
FIG. 1 shows a portion of an automotive vehicle body styling bridge on which the improved scanner of our invention is mounted.

In FIG. 1 numeral 10 designates generally one side of a vehicle body styling bridge under which is positioned a clay model 12 of an automotive vehicle body. The side 10 of the bridge is supported on a surface plate 14 by means of casters, not shown, and by means of a cooperating rail running in the X axis direction. The bridge can be moved from one X axis position to another. The inner margin 16 of the bridge side 10 is scaled so that Y axis dimensions can be measured. This is done by placing a scale in a horizontal position on scale support bars 18 which can be raised and lowered along the bridge side 10 by a suitable adjusting mechanism, not shown.

An electromechanical probe 20 is supported by a pedestal in the form of a cylindrical shaft 22 which is secured to a base 24 carried by the bridge side member 10. The probe 20 includes a gauge head 26 carried at the end of a supporting probe shaft or rod 28. The head 26 is adapted to contact the clay model surface, as indicated in FIG. 1, with a slight probing pressure.

Numeral 30 generally designates an electric motor powered pen assembly which is actuated in the direction of the axis of rod 28. As the gauge head 26 scans the model surface, it is adapted to create a series of contour lines 32, one line corresponding to the readings taken at each separate characteristic section as determined by the X axis position of the bridge. The lines 32 are recorded on a sheet 34 held firmly in place by a rigid supporting plate. This in turn is secured so that its plane is perpendicular to the surface plate 14 and also perpendicular to the plane of the longitudinal axis of symmetry of the model 12. Suitable bracket structure 36 can be provided at the base of the bridge side 10 and a corresponding supporting bracket can be provided at the upper end of sheet 34.

A fixed mounting bracket 38 shown in FIG. 4A is bolted to the styling bridge side member 10. It is formed with an opening through which the pedestal or shaft 22 extends. The upper end of the pedestal 22 carries a support plate 40 which is secured thereto by bolts 42. This in turn supports a lead screw drive motor 44 which may be a ¼ H.P. 110 volt D.C. motor. The armature shaft 46 of the motor 44 is coupled by a shaft coupling 48 to a right angle drive and geared speed reducer 50, the output shaft for which is shown at 52. The speed reducer 50 also is supported by the plate 40 and is held securely thereon by bolts 54. Output shaft 52 can be coupled to a lead screw shaft 56 by means of a coupling member 58. This is connected, as shown in FIG. 5, to shaft 52 by means of a keyway and a cooperating key 60. The coupling member 58 in turn is connected to lead screw shaft 56 by means of a tongue and slot connection 62.

The upper end of the shaft 56 is journaled in opening 64 formed in plate 40, a suitable ball bearing assembly 66 being provided for this purpose. The lower end of the shaft 56 can be mounted in a similar fashion in the base 24.

The probe 20 includes a generally cylindrical housing 68 to which is secured a sleeve or collar 70, the axis for which extends vertically. The axis of the housing 68, on the other hand, extends horizontally. The collar 70 surrounds the stationary pedestal or shaft 22. The collar 70 is formed with an opening through which a lead screw nut 72 is received. The lead screw shaft 56 is threadably received within the nut 72. Since the shaft 56 is held axially fast by bearing assembly 66, rotation of the lead screw shaft 56 will cause the collar 70 to rise or fall depending upon the direction of rotation of the shaft 56.

A drive motor for adjusting the rod 28 in the direction of the Y axis is shown in FIG. 8. It includes a servo motor assembly 74 which has a power output armature shaft 76. This is coupled by means of a coupling 78 to a drive pinion 80. This pinion is journaled rotatably by bearing assembly 82 carried by a bearing support that forms a part of an adapter housing 84 which secures the servo motor 74 to a right angle drive gearing assembly 86.

Pinion 80 includes an extension 88 which is journaled by bearing assembly 90 in the bearing opening formed in one wall of housing 92 for the gearing assembly 86. Housing 92 includes a supporting sleeve 94 received telescopically within a sleeve 96. This in turn is received within an opening 98 formed in a portion of the housing 68 for the probe 20.

A power output gear 100 carried by power output shaft 102 is located in the housing 92. Gear 100 engages drive pinion 80. Shaft 102 is rotatably journaled in housing 92 by axially spaced bearings 104 and 106. The lower end of the shaft 102 is connected by means of a key 108 to a pinion 110. This meshes with a rack 112, which in turn is secured, as shown in FIG. 7, to the rod 28, suitable bolts 114 being provided for this purpose.

Rod 28 is engaged at equally spaced angular positions by supporting rollers 116. Each roller 116 is journaled by a roller pin 118 positioned within an opening 120 formed in the housing 68. Rotation of the pinion 110 about its axis then will result in reciprocating movement of rod 28 within housing 68.

As seen in FIG. 6A, the right-hand end of the rod 28 has secured thereto a scriber assembly 122. This includes a scriber assembly housing 124 which encloses a scriber pen drive motor 126. A driven shaft 128 for the scriber assembly 122 carries a pulley 130 which in turn is driven by the armature shaft 132 of the motor 126. A suitable belt drive can be used between the shaft 132 and the pulley 130 as shown at 134.

Drivably connected to the shaft 128 is a scriber element or pen 136. Pen 136 is rotatably driven by shaft 128 and is biased in an axially outward direction by spring 138.

As indicated very generally in FIG. 6A and more particularly in FIG. 1, the scriber element 136 is adapted to engage the paper 34 carried by the styling bridge side member 10.

As the gauge head 28 traverses a section line on the surface of the clay model 12, with the drive motor 44 causing vertical displacement of the gauge head in a Z axis direction and the drive motor 74 moving the gauge head 26 in a Y axis direction, the scriber assembly 122 will develop a section contour line as illustrated in FIG. 1 at 32.

As seen in FIG. 9, the rod 28 has secured thereto a rack 112 having rack teeth 140. Rollers 142 and 144 serve as guides. These are mounted on pins which extend through a bearing block 146. This block is received within an opening 148 formed in the housing 68 for the probe 20.

A microswitch assembly 150 can be mounted on the housing 68, as shown in FIGS. 6A and 9. It may include a plunger 152 which is triggered as its cam follower roller 154 engages a relatively stationary cam when the probe 20 is raised or lowered to an extreme limiting position. This would interrupt the motor circuit for the drive motor 44.

The gauge head shown in FIGS. 10 through 13 includes an adapter 156 having a stem that is adapted to be received within and secured to the end of the rod 28. An intermediate housing portion 158 for the gauge head includes a flange at its right-hand end that is bolted to the flange 160 on the adapter 156. The left-hand end of the housing portion 158 is flanged to permit a bolted connection with a cooperating flange 162 on the right-hand end of the housing 164.

Housing 164 generally is of cylindrical configuration. It surrounds a sleeve 166 which engages at its right-hand end the left-hand surface of the flange located at the left-hand end of the intermediate housing portion 158. A cylindrical socket member 168 is received within the left-hand end of the housing 164. It is adapted to abut the left-hand end of the sleeve 166. A probe closure member 170 is positioned at the open end of the housing 164.

The left-hand margin of the housing 164 is flanged at 172 so that the assembly is held axially fast. The member 170 is situated between the flange 172 and the left-hand end of the socket member 168. A cap of circular form surrounds the member 170 as shown at 174. A dust cover 176 surrounds a probing element which is in the form of a scanner shaft 178. The cover 176 is located between cover 174 and member 170.

Scanner shaft 178 extends through the member 170 and through opening 180 formed in the socket member 168. A spherical bearing element 182 is located within the opening 180 with a minimum clearance so that it is adapted to move freely therein with a minimum amount of free play. Element 182 is formed with an opening 184 through which the shaft 178 extends.

A bearing ring 186 is positioned in the opening 180. It includes a surface of cylindrical curvature which is contiguous with and which engages bearing element 182.

Four mechanical stops in the form of set screws 188 are positioned radially in the member 170. Two of these are shown. The other two stops 188 are positioned 90° out of position with respect to the stops shown in FIG. 10. The stops are positioned radially so that pivotal movement of the shaft 178 will be limited as the shaft 178 oscillates about the geometric center of the spherical bearing element 182.

The shaft 178 can be of hexagonal cross-section, as indicated in FIG. 11, but it includes also a section of reduced transverse dimension as shown at 190. The innermost end of the shaft 178 is of enlarged cross-section and it includes a conical cam surface 192 which is engaged by a cam ball 194. The ball is carried by the inner end of a pivoted link 196. This link extends through an opening 198 formed in the upper side of the housing 164. It is carried by a rocker shaft 200. Link 196 is urged in a clockwise direction with respect to the shaft 200 by means of a tension spring 202, one end of which is connected to an anchor post 204.

This post forms a part of an anchor member 206 having a hub 208 through which a pivot pin 210 extends. The pin 210 in turn is anchored, as shown in FIG. 11, inside openings 212 and 214 formed in the housing portion 164.

Adjustable stops 216 and 218 are provided for determining the angular position of the member 206 with respect to the axis of the pin 210. The spring tension of spring 202 can be controlled also by adjusting the stops 216 and 218. These stops, as shown in FIG. 11, engage a reaction shoulder 220 formed on the inside of the sleeve 166.

The innermost end of the lever 196 is displaced slightly from a trigger element 220 of a limit switch assembly 222. This switch assembly comprises a part of the motor circuit for drive motor 74. It serves as a safety device for interrupting the motor circuit when the pressure applied to the end of the probe shaft 178 becomes extreme. A secondary mechanical stop 224 also can be provided for limiting the angular position of the lever 196.

Spring 202 applies a thrust force on the shaft 178 in a left-hand direction. This causes the spherical bearing element 192, which is held axially fast on the shaft 178, to engage normally the bearing surface.

As the rod 28 is advanced toward the clay model by the drive motor 74, the spring 202 will maintain the spherical bearing element 182 in a fixed position. When model contacting pressure is obtained, an axial force is applied to the shaft 178. The spring 202 then will yield when the spring load is overcome. This then causes the link 196 to rotate shaft 200 in a counterclockwise direction. In a similar fashion, if the end of the probe shaft 178 engages the clay model in such a way that a force is applied to the shaft 178 in a direction transverse to the axis of the shaft 178, the shaft 178 will pivot about the axis of the spherical bearing element 182. This then will cause the ball 194 to ride over the conical cam surface 192. This then displaces the link 196 in a counterclockwise direction in the same fashion that it responds to an actual force applied to the shaft 178. Thus, regardless of the direction of the force applied to the end of the shaft 178, the link 196 will be pivoted.

The end of the shaft 178 carries a probe tip 226 having a rounded end that engages the clay model. It can be made removable from the shaft 178 by providing a threaded connection with the shaft 178 as shown at 228. Further, a necked-down area 230 of the tip 226 can be provided to permit it to break when excessive forces are applied to it. This avoids shock loads on the probe itself. The tip then can be replaced by another one.

Shaft 200 forms a part of a linear-differential transformer 232 which is bolted, as shown in FIG. 13, to the central housing portion 158. The differential transformer senses movement of the shaft 200 in either one direction or the other as the probe shaft 178 is adjusted. When the probe is subjected to increasing pressure by the clay model surface, shaft 200 will rotate in one direction as the tension of spring 202 is overcome. As the pressure is relieved beyond the point determined by the preloaded spring 202, the shaft 200 will rotate in the opposite direction. Movement of the shaft 200 in each of the two directions is sensed by the linear-differential transformer which develops either a plus voltage signal or a minus voltage signal in either of two output electrical conduits 234 or 236. These conduits extend to an amplifier 238 which in known fashion develops either a positive or negative input for a motor 74 to which it is electrically connected by electric conduits 240.

The motor armature shaft is connected, as explained previously, to the rod 228 which carries the probe 20. The zero point can be adjusted by an appropriate manual null set 242. Any deviation from a pre-established voltage in the amplifier 238 will result in a motor signal voltage which will cause rotation of the motor armature in either one direction or the other depending upon the direction of the deviation. The mechanical connection between the motor armature shaft and the probe 20 completes the closed servo loop. The probe 20 then will tend to maintain registry with the model surface with a predetermined probing pressure as the motor 44 drives the probe in a Z axis direction. The probe tip then will follow the contour of the surface as vertical adjustments in the probe height are made. This will require movement of the rod 28 in both directions. The motion path followed by the probe tip is then registered by the scriber assembly, as indicated at 32.

A vertical reference plane for the recordings can be located by scribing a vertical line at some known distance from the end of the probe. Similarly, a reference horizontal plane can be located by means of horizontal line readings. A vertical or Z axis direction then can be made with reference to the horizontal lines. These readings are indicated on the scale 16 on the styling bridge side member 10. The X axis position of the probe is determined, of course, by the horizontal scale adjacent the surface plate on which the styling bridge is mounted.

The contours 32 can be used for the purpose of forming templates or they can be used in preparing two-dimensional body draft layouts, as explained previously.

In FIG. 15 we have shown an alternate probe assembly construction that is very similar to the probe described in reference to FIGS. 10 through 14A. It includes, however, an additional spring, as shown at 242, situated between a thrust ring 244 and a spring seat 246 secured between sleeve 166' and member 168'. For purposes of clarity, the reference characters used in illustrating FIG. 15 are similar to those used in illustrating FIG. 14A, although prime notations have been added.

Thrust ring 244 engages the spherical bearing element 182' so that its spring rate will complement the action of spring 202'. This then introduces a second variable that can be used in calibrating the probe. If such a second variable is not desired in any particular application, the FIG. 10 construction may be used instead.

In FIGS. 14A through 14F there is shown another probe arrangement that is adapted to function in a manner similar to the FIG. 10 and FIG. 15 designs. It includes parts that are common to the design of FIG. 10 and for this reason similar reference characters are employed to identify parts although double prime notations are added. Unlike the other designs, however, the forward end of the probing assembly comprises a flexible diaphragm 248 which is secured at its outer margin to the housing 164". It is received between sleeve 166" and the closure member 170".

The probe shaft 178", unlike the probe shaft 178 of FIG. 10, is tapered and is secured at its left end to the diaphragm 248 at its center. For this purpose the diaphragm is formed with an opening 250 through which is received hub 252. The left end of the shaft 178" is threadably connected to the hub 252'.

A shaft extension 178A is connected by a threaded connection 254 to the hub 252. The end of the extension 178A carries the model contacting tip which can be in the form of a ball that is shown at 256.

The member 170" is formed with an opening 258 within which is positioned a pivot ring 260. An annular shoulder 262 is formed on one side of the ring 260 and is adapted to engage the center region of the diaphragm 248.

As probing pressures are applied to the model contacting tip 256 in an axial direction, the diaphragm 248 can deflect, thus causing the shaft 178" to shift axially and causing the link 196" to shift in a counterclockwise direction. Shifting motion occurs whenever the spring tension of spring 202", as modified by the spring rate of the diaphragm 248 itself, is overcome.

If the tip 256 of the probe is subjected to a transverse probing pressure force, the diaphragm 248 will tend to tilt, as seen in FIG. 14F, about the annular shoulder 262 as the shaft 178" is displaced angularly. This angular motion, of course, is translated into a counterclockwise motion of the link 196" by reason of the conical cam connection at 192". The diaphragm 248 thus serves both as a means for mounting pivotally the shaft 178" and as a spring, the characteristics of which determine in part the calibration of the probe. The spring constant for the diaphragm 248 complements the spring rate for spring 202".

A limit switch shown in part at 264 is adapted to sense the displacement of the diaphragm 248 beyond a predetermined limiting position. When this happens, the limit switch will signal the interruption of the motor circuit for the motor 74.

A mechanical stop 266 is received threadably in the member 170". Four such stops can be provided to limit the motion of the extension 178A in any direction.

Having thus described preferred forms of our invention, what we claim and desire to secure by U.S. Letters Patent is:

1. An electromechanical probe adapted to scan surface points on a three-dimensional body comprising a probe housing, a probe shaft mounted within said housing for reciprocation in the direction of its axis, a movable support, said housing being carried by said support, first motor means for moving said housing along said support in a direction coinciding with the direction of a first coordinate axis, a second coordinate axis coinciding with the direction of movement of said shaft, second motor means for reciprocating said shaft with respect to said housing in the direction of said second coordinate axis, a third coordinate axis, a probe head carried by the extended end of said shaft, a scanner shaft in said head, one end of said scanner shaft extending externally from said head, means for mounting said scanner shaft intermediate its ends for universal angular movement with respect to said housing and for reciprocatig movement in the direction of its axis, a linear-differential transformer having a mechanical motion input member, a ball and cam connection between the other end of said scanner shaft and one end of said input member including a cam and a cooperating ball registering therewith, said ball being carried by one of said ends and said cam being carried by the other of said ends, said cam forming a regular goemetric surface of revolution symmetrical with respect to a line passing through the center of said ball, the extended end of said scanner shaft being adapted to engage said body with a probing pressure, deflection of said scanner shaft in any direction due to said probing pressure causing displacement of the other end of said scanner shaft, said transformer being connected electrically to said second motor means thereby completing a closed servo loop which is adapted to interrupt and complete the motor circuit for said second motor means in response to changes in probing pressure from a predetermined value, first spring means for forcing said two ends together in registry whereby the force required to deflect said scanner shaft in the direction of its axis is less than the force required to deflect said scanner shaft angularly about said scanner shaft mounting means, the mounting means for said scanner shaft comprising a first bearing element of generally spherical form connected to said scanner shaft, a second spherical bearing member carried by said probe housing and having formed therein a cylindrical bearing chamber that receives said first bearing member, and additional spring means for normally biasing said scanner shaft in the direction of said second coordinate axis toward the point of contact of said extended scanner shaft and with said body, whereby axial displacement of said scanner shaft under the influence of probing pressure in the direction of said scanner shaft axis is resisted thereby influencing the ratio of the forces necessary to deflect said extended scanner shaft end in the direction of said second coordinate axis relative to the corresponding forces necessary to deflect the same scanner shaft end with respect to another coordinate axis, the direction of the force of said additional spring means corresponding continuously to the direction of said second coordinate axis regardless of the direction of the force component acting on said extended scanner shaft end.

References Cited

UNITED STATES PATENTS

| | | | |
|---|---|---|---|
| 2,766,003 | 10/1956 | Dall et al. | 90—62 |
| 2,911,182 | 11/1959 | Clarke et al. | 90—62 |
| 3,121,370 | 2/1964 | Larsen | 90—62 |
| 3,235,222 | 2/1966 | Nickell | 90—62 |
| 3,252,379 | 5/1966 | Labruyere | 90—62 |
| 3,192,628 | 7/1965 | Wroble | 33—23 |
| 3,122,970 | 3/1964 | Rhoades | 90—62 |
| 2,911,727 | 11/1959 | Steinhart | 33—174 |
| 2,576,590 | 11/1951 | Gentzhorn | 33—172 |
| 2,231,805 | 2/1941 | Freitas | 33—172 |

HARRY N. HAROIAN, Primary Examiner

U.S. Cl. X.R.

33—23